United States Patent
Viel et al.

(10) Patent No.: US 10,077,715 B2
(45) Date of Patent: Sep. 18, 2018

(54) ACCESSORY GEARBOX

(71) Applicant: Hispano Suiza, Colombes (FR)

(72) Inventors: Julien Viel, Argenteuil (FR); Jordane Peltier, Paris (FR); Stéphane Prunera-Usach, Rueil Malmaison (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 17 days.

(21) Appl. No.: 15/111,618

(22) PCT Filed: Jan. 15, 2015

(86) PCT No.: PCT/FR2015/050092
§ 371 (c)(1),
(2) Date: Jul. 14, 2016

(87) PCT Pub. No.: WO2015/107300
PCT Pub. Date: Jul. 23, 2015

(65) Prior Publication Data
US 2016/0333792 A1   Nov. 17, 2016

(30) Foreign Application Priority Data
Jan. 16, 2014 (FR) .................................... 14 50342

(51) Int. Cl.
*F02C 7/32* (2006.01)
*F01D 25/18* (2006.01)
(Continued)

(52) U.S. Cl.
CPC ................ *F02C 7/32* (2013.01); *F01D 25/18* (2013.01); *F02C 7/06* (2013.01); *F16H 57/02* (2013.01);
(Continued)

(58) Field of Classification Search
CPC .... F02C 7/06; F02C 7/32; F01D 25/18; F16H 57/02; F16H 57/04; F16H 2057/02013;
(Continued)

(56) References Cited

U.S. PATENT DOCUMENTS 2,803,943 A * 8/1957 Rainbow .................... F02C 7/32
60/262
2,978,869 A   4/1961 Hiscock
(Continued)

FOREIGN PATENT DOCUMENTS

| FR | 2 941 744 A1 | 8/2010 |
| WO | 87/04222 A1 | 7/1987 |
| WO | WO-2016059346 A1 * | 4/2016 ................ F02C 7/32 |

OTHER PUBLICATIONS

Search Report issued in French Patent Application No. FR 1450342 dated Oct. 22, 2014.
(Continued)

*Primary Examiner* — Adam D Rogers
(74) *Attorney, Agent, or Firm* — Pearne & Gordon LLP

(57) ABSTRACT

An accessory gearbox for turbomachine equipment comprising a casing (30) and two gear lines (40a, 40b) arranged in a "V" shape, the casing (30) comprising two arms (30a, 30b) in both of which one of the two gear lines (40a, 40b) is arranged, with a lubricant tank (35) being arranged between the two gear lines (40a, 40b).

5 Claims, 2 Drawing Sheets

(51) Int. Cl.
*F16H 57/04* (2010.01)
*F02C 7/06* (2006.01)
*F16H 57/02* (2012.01)

(52) U.S. Cl.
CPC ......... *F16H 57/04* (2013.01); *F05D 2250/75* (2013.01); *F05D 2260/4031* (2013.01); *F05D 2260/98* (2013.01); *F16H 2057/02017* (2013.01)

(58) Field of Classification Search
CPC . F16H 2057/02017; F16H 2057/02026; F05D 2250/75; F05D 2260/4031; F05D 2260/98
See application file for complete search history.

(56) References Cited

U.S. PATENT DOCUMENTS

| | | | | |
|---|---|---|---|---|
| 8,347,637 B2* | 1/2013 | Suciu | ........................ | F02C 7/32 60/802 |
| 8,905,191 B2* | 12/2014 | Brandt | .................... | F01D 25/18 184/6.11 |
| 8,973,465 B2* | 3/2015 | Duong | .................... | F16H 1/222 60/802 |
| 9,845,735 B2* | 12/2017 | Duong | ..................... | F02C 7/32 |
| 2013/0180262 A1* | 7/2013 | Duong | ..................... | F02C 7/32 60/802 |
| 2015/0204246 A1 | 7/2015 | Peltier | | |
| 2016/0138414 A1* | 5/2016 | Armange | ................ | F16H 1/225 415/182.1 |
| 2016/0146111 A1 | 5/2016 | Prunera-Usach | | |
| 2016/0146291 A1 | 5/2016 | Prunera-Usach | | |
| 2016/0245183 A1* | 8/2016 | Viel | .......................... | F02C 7/32 |
| 2017/0009660 A1* | 1/2017 | Viel | .......................... | F02C 7/32 |
| 2017/0218848 A1* | 8/2017 | Alstad | .................... | F02C 7/232 |
| 2017/0306854 A1* | 10/2017 | Guillemont | ............... | F02C 7/32 |

OTHER PUBLICATIONS

International Search Report issued in Application No. PCT/FR2015/050092 dated May 13, 2015.

Written Opinion issued in Application No. PCT/FR2015/050092 dated May 13, 2015.

\* cited by examiner

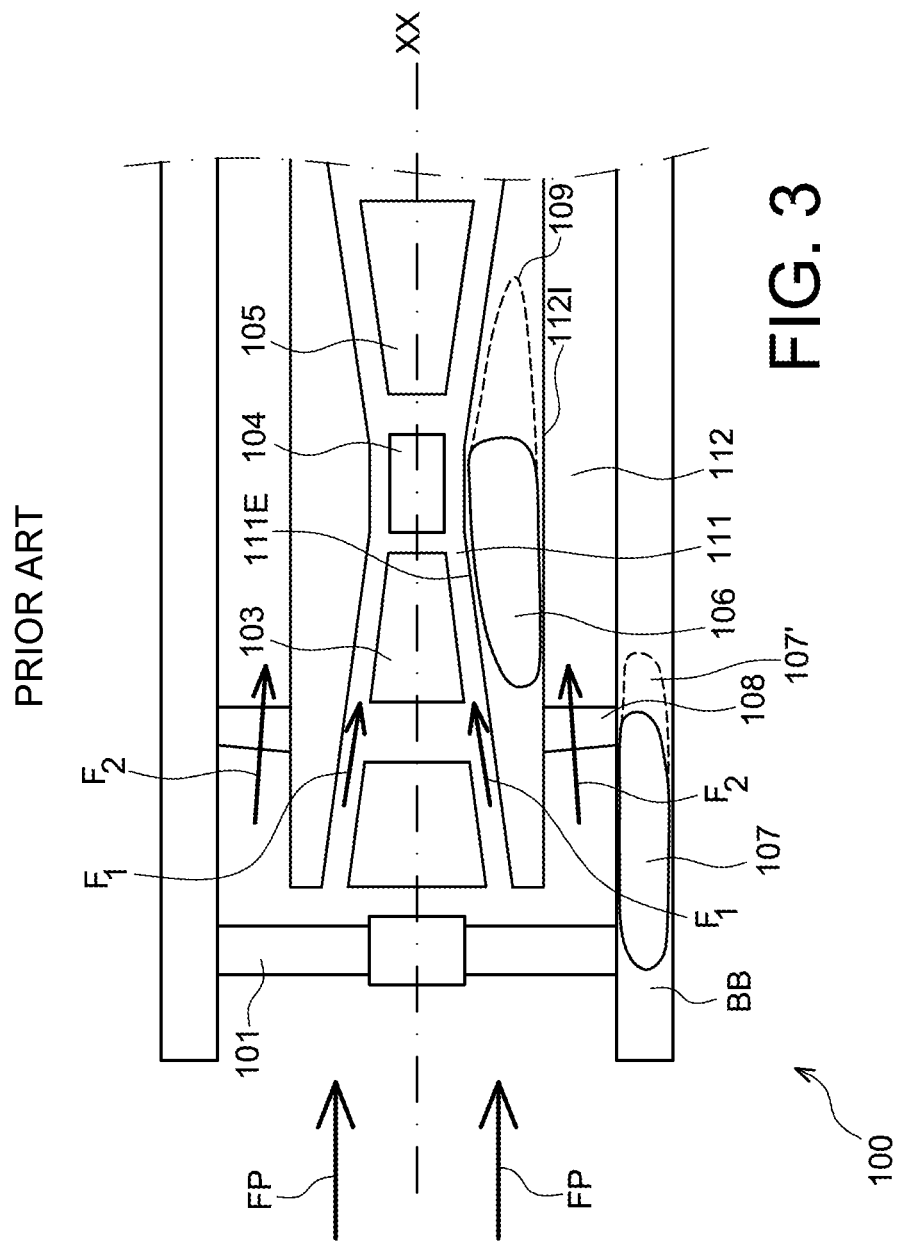

ACCESSORY GEARBOX

TECHNICAL FIELD

This invention relates to accessory gearboxes (AGBs) for equipment present in aircraft turbomachines.

Such AGBs generally comprise a gear line that makes it possible to transfer mechanical energy between engine members, for example a starter or a compressor, and slave members such as an electric generator or a hydraulic pump or other equipment.

The term gear line is to be understood here as a set of adjacent geared pinions and located in the same plane or in parallel planes.

More precisely, the invention relates to an AGB structure that can be integrated into a double-flow turbojet.

PRIOR ART

A double-flow turbine engine 100 extending according to a longitudinal axis XX (FIG. 3) comprises a primary flow path 111 in which circulates a primary flow F1 brought to pass through a set of compressors 103, a combustion chamber 104 then a set of turbines 105. The turbojet 100 also comprises a secondary flow path 112 arranged around the primary flow path 111 and wherein a secondary flow F2 circulates.

The most widespread AGB architecture is an AGB in the shape of a banana or crescent, arranged in the nacelle located around the secondary flow path. Such an AGB then extends axially in a zone 107 called fan zone located between the fan 101 and a secondary rectifier 108 extending in this flow path. The fan zone can also extend beyond the rectifiers, such as has been diagrammed in the zone 107'. At least one of the radial arms of the secondary rectifier 108 is hollow and is passed through at its core by a movement transfer shaft, called radial shaft, and systems of ducts that can link the AGB equipment to other equipment arranges in another zone 106 of the turbomachine called core zone. The core zone 106 is the space located between the outer wall 111E of the primary flow path 111 and the inner wall 112I of the secondary flow path 112, for example around the high-pressure compressor 103 and the combustion chamber 104.

Alternative architectures of AGB existent such as AGBs with a "V" shape. The latter comprise two gear lines arranged at an angle with respect to one another, i.e. of which the orientation planes of the respective pinion or pinions are secants. Such architectures can be arranged in the core zone 106.

DISCLOSURE OF THE INVENTION

The object of the invention is an improved architecture of AGB with a "V" shape.

The invention as such relates to an accessory gearbox for turbomachine equipment comprising a casing and two gear lines arranged in a "V" shape, the casing comprising two arms in each of which one of the two gear lines is arranged, with a lubricant tank being arranged between the two gear lines.

The invention makes it possible as such to offset the tank from the fan zone to the core zone located between the primary flow path and the secondary flow path. Space is released in the fan zone, which makes it possible to increase the diameter of the fan and the performance of the engine.

In addition, in the case of an AGB referred to as core, i.e. arranged in the core zone, the tank is brought closer to the equipment that uses lubricant. The lengths of the lubrication ducts are then reduced and the general architecture of the lubrication system is then simplified.

The invention further makes it possible to take advantage of the space available between the two arms of the AGB each comprising at least one piece of equipment, with the two arms being arranged in a "V" shape with respect to one another. The invention therefore makes it possible to improve the integration of the tank.

Advantageously, the lubricant tank is integrated into the casing.

In an advantageous configuration, the casing is a first crankcase, and the lubricant tank is a second crankcase mounted in the first crankcase or against the first crankcase.

In an alternative advantageous configuration, the casing is a cast part.

In another advantageous configuration, the casing is a part produced by additive manufacturing.

The tank can be a cavity arranged in the casing.

The lubricant tank can form a main lubricant tank for the AGB or be only an auxiliary or secondary tank, for example as a sub-part of a total volume of lubricant tanks, for example for use as a secondary tank used solely in the case of degraded mode. Degraded modes are for example post-incident situations of the windmilling type without oil, when the fan is rotating at a reduced speed, which do not allow the main lubrication unit to correctly supply the oil system. This is referred to as under-lubrication. The secondary tank can then be used for a limited duration, coupled to a system that makes it possible to supply the transmission members at a low flow rate.

The invention also relates to a turbomachine comprising an accessory gearbox for equipment such as described hereinabove and arranged in the core zone, located between a primary flow path and a secondary flow path of the turbomachine.

Alternatively, the invention relates to a turbomachine comprising an accessory gearbox for equipment such as described hereinabove and arranged in the fan zone.

BRIEF DESCRIPTION OF THE DRAWINGS

The invention can be better understood when reading the following detailed description, of non-limited examples of implementation of the latter, as well as examining the annexed figures, diagrammatical and partial, wherein.

DETAILED DISCLOSURE OF PARTICULAR EMBODIMENTS

Figure 1:
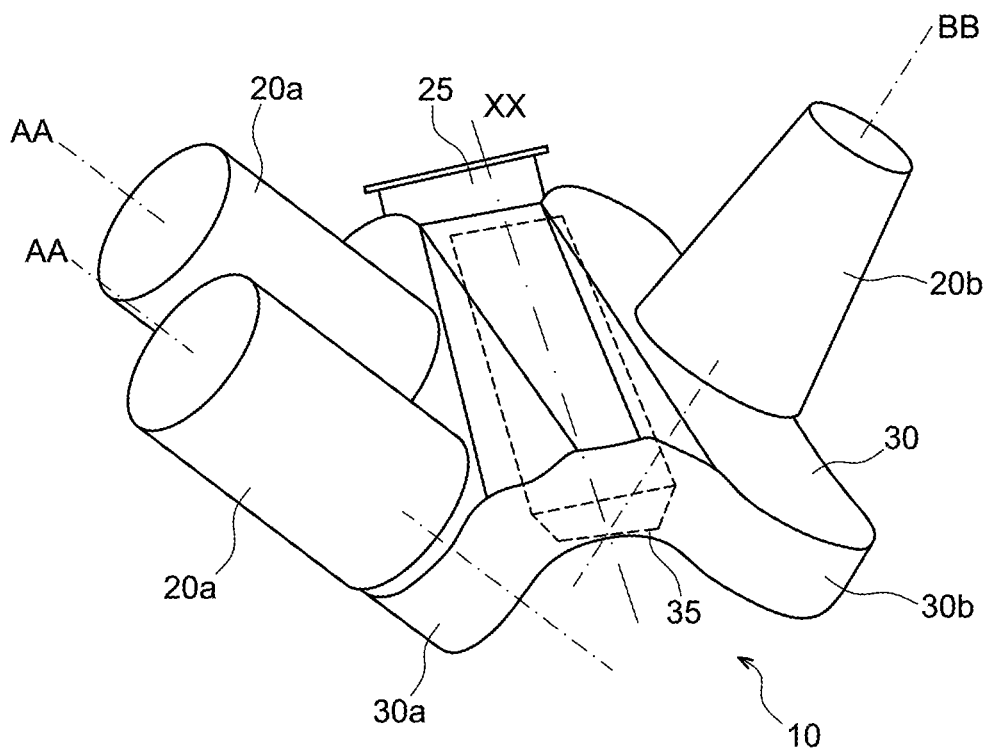
FIG. 1 is a perspective view of an accessory gearbox for equipment according to the invention.
Figure 2:
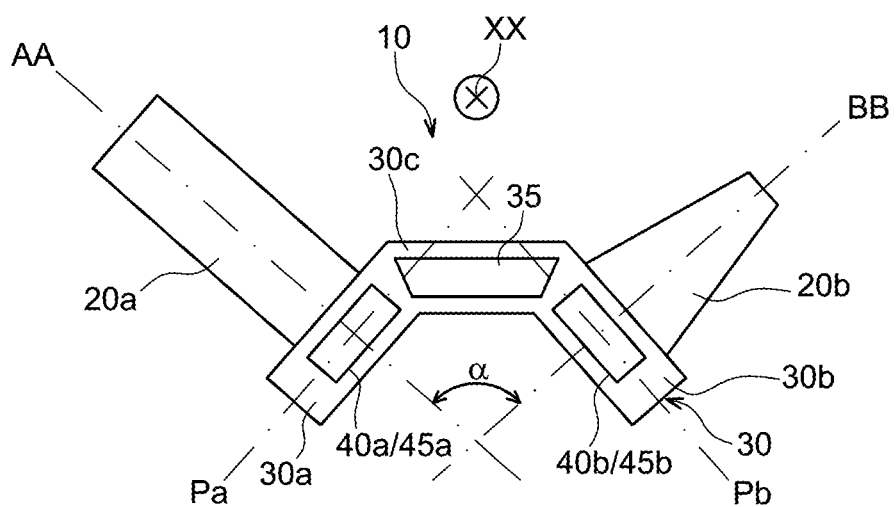
FIG. 2 is a cross-section of the accessory gearbox for equipment of FIG. 1; and, FIG. 3 is a general view of a double-flow turbine engine wherein the accessory gearbox for equipment according to the invention can be implemented.

FIGS. 1 and 2 show an accessory gearbox 10 according to the invention provided for example for a double-flow turbo engine such as the turbojet 100 (FIG. 3). The accessory gearbox for equipment 10 is here arranged in the "core zone" 106 of the turbomachine such as defined in the preamble, here under the longitudinal axis XX of the turbomachine (FIGS. 2 and 3). Alternatively, the accessory gearbox 10 is arranged above or on the side of the axis XX (alternative not shown). Further alternatively, the accessory gearbox 10 is arranged in the fan zone (alternative not shown).

In the embodiment shown in reference to FIG. 1, the front portion of the figure corresponds to the rear of the gearbox 10, oriented downstream of the turbomachine, while the rear portion of the figure corresponds to the front of the gearbox 10, oriented upstream. This orientation is however not limiting.

The gearbox 10 comprises a casing 30 provided with two arms 30a and 30b. A gear line 40a or 40b is mounted in each one of the arms 30a and 30b (see FIG. 2). The gear lines 40a and 40b each comprise a respective pinion 45a or 45b extending according to a plane Pa or Pb, or a general plane parallel to one of these two planes Pa and Pb. It is then said that the planes Pa and Pb are the general orientation planes of the gear lines 40a and 40b.

Two pieces of equipment 20a and a piece of equipment 20b are here mounted on either side of the gearbox 10 on the respective upper face of each arm 30a and 30b.

Each piece of equipment 20a and 20b is supplied in rotating movement by a shaft of which a foot is arranged in the casing 30. More precisely, each foot is provided with a pinion such as one of the pinions 45a and 45b. In FIG. 1, the shafts and the pinions are not shown for reasons of legibility.

The shafts of the equipment 20a are oriented according to an axis AA, the shaft of the equipment 20b is oriented according to an axis BB. The equipments 20a and 20b form a "v" with an orientation opposite a "V" defined in relation to the pinions, i.e. the axes AA are oriented according to an angle α that is different from a flat angle, i.e. different from 0° or 180°, in relation to the axes BB. In a preferred but not limiting manner, this angle α is between 100° and 150°. In other terms, the planes Pa and Pb of general orientation of the gear lines 40a or 40b or of their pinion or pinions 45a or 45b are secant according to a "V" shaped profile, i.e. they are not confounded or parallel.

A TGB 25 (Transfer Gearbox) is arranged here in a non-limiting manner at the front of the gearbox 10. One end of a transfer shaft of the rotating energy coming from the turbine is for example housed in the TGB 25.

A lubricant tank 35 is here arranged between the gear lines 40a and 40b. In the embodiment shown, the tank 35 is integrated into the casing 30 in a central interval 30c located between the arms 30a and 30b.

The tank 35 is located more precisely between the two arms 30a, 30b, on the junction between their two closest ends. In other terms the tank 35 is located globally in the vicinity of the point of the V defined by the equipment 20a and 20b, with the hollow of this V being open in the direction of the longitudinal axis XX of the turbomachine (see in particular FIG. 2).

The casing 30 can be manufactured via casting or via a similar method (for example of the additive manufacturing type, such as by laser powder fusion or by powder spraying or other methods), or via machining in the mass or by machining separate walls and later assembly of the latter. The lubricant tank 35 can be in a non-limiting manner a cavity provided in a larger part or a separate crankcase, located in the casing 30 or exteriorly and against the latter.

When the casing 30 is manufactured by casting, the tank 35 is preferentially a cavity arranged in the raw casting.

When the casing 30 is a crankcase formed for example of machined walls, the tank 35 is preferentially a second separate crankcase arranged in the casing 30.

Generally, a lubricant tank such as the tank 35 placed as such between the equipment 20a and 20b makes it possible to minimise the lengths of the lubricant supply ducts and to simplify the architecture thereof.

Alternatively, equipment is mounted in a turbine zone arranged between the walls 111E and 1121, for example in the zone 109 with regards to a turbine 105 (FIG. 3) and/or the accessory gearbox 10 extends itself into this turbine zone 109.

The tank 35 can form the main lubricant tank of the AGB. The tank 35 can furthermore form a portion only of the total volume of lubricant tanks provided to supply the AGB, or even be an oil tank for degraded operating phases.

Other alternatives are still possible without leaving the scope of the invention.

What is claimed is:

1. An accessory gearbox for a turbomachine equipment comprising:
   a casing having a first arm and a second arm;
   a first gear line arranged in the first arm, the first gear line including a first pinion extending according to a first orientation plane;
   a second gear line arranged in the second arm, the second gear line including a second pinion extending according to a second orientation plane, the second orientation plane being arranged at an angle with the first orientation plane to form a "V" shape; and
   a lubricant tank arranged between the first gear line and the second gear line.

2. The accessory gearbox for turbomachine equipment, according to claim 1, wherein the lubricant tank integrated into the casing.

3. The accessory gearbox for turbomachine equipment, according to claim 1, wherein the casing is a cast part.

4. The accessory gearbox for turbomachine equipment, according to claim 3, wherein the lubricant tank is a cavity arranged in the casing.

5. The accessory gearbox for turbomachine equipment, according to claim 1, wherein the casing is produced by additive manufacturing.

* * * * *